United States Patent Office  3,409,533
Patented Nov. 5, 1968

3,409,533
MERCURY-METHOD CELL FOR ALKALI CHLORIDE ELECTROLYSIS
Koichi Murayama and Shoji Toshima, Nobeoka-shi, and Toshio Fukushima, Tokyo, Japan, assignors to Asahi Kasei Kogyo Kabushiki Kaisha, Osaka, Japan, a corporation of Japan
Filed Mar. 23, 1964, Ser. No. 354,033
6 Claims. (Cl. 204—219)

ABSTRACT OF THE DISCLOSURE

An electrolytic cell for electrolyzing an aqueous alkali chloride solution using a platinum-plated titanium anode and a mercury cathode at a high current density of over 100 amp./dm.$^2$, a voltage of not more than 4.5 volts and a current efficiency as high as 99%, wherein the electrode distance is reduced to less than 3.5 mm. without short circuit, and the resulting foam layer on the electrolyte surface in a amalgamation chamber is removed therefrom.

---

This invention relates to a process for the electrolysis of mercury-method alkali chloride and an electrolytic cell to be used for that purpose, and more specifically to a process for effecting the electrolysis at a high current density by using an anode consisting of titanium plated with platinum, and an electrolytic cell therefor.

For electrolysis of mercury-method alkali chloride, it has generally been the practice to use a graphite anode and employ as high a current density as economically possible in the light of the voltage to be used, thereby to cut down the manufacturing cost. Usually, however, the working current density is from 35 to 50 amp./dm.$^2$, and at most about 100 amp./dm.$^2$. No higher current density has ever been used. This is because electrolysis at a high current density of over 100 amp./dm.$^2$ with a graphite anode brings increased heat development, elevation of voltage, breakdown of plates and other troubles due to the poor conductivity of the graphite anode, and also invites the possibility of explosion due to mixing in chlorine gas of hydrogen gas generated by a drop in the hydrogen overvoltage which is caused by the broken chips of the plates, in addition to contamination of chlorine gas with resulting carbonic acid gas, and further results in deteriorated commercial practicability due to the decrease of current efficiency. For these reasons, extreme difficulties have hitherto been encountered in effecting electrolysis with a graphite anode at such a high current density of over 100 amp./dm.$^2$.

In order to correct those defects, a platinum-titanium anode has been introduced. It has great corrosion resistance, workability, electric conductivity, mechanical strength, and oxygen overvoltage. As this electrode does not react with producer gas nor form broken plate chips, it gives no hydrogen gas. Therefore, it maintains chlorine gas in a highly pure state, minimizes the danger of explosion, and maintains the current density at a remarkably high level. However, these and other advantages of the new electrode are more than offset by the high cost of titanium and platinum materials, the difficulty of plating titanium plates with platinum. Moreover, there is no marked difference in the electrolytic voltage between the platinum-titanium and graphite anodes, so far as the same structure and the same process are employed. Such drawbacks have prevented the new electrode from being produced on a commercial basis.

An object of the present invention is to provide a process of carrying out electrolysis of mercury-method alkali chloride by the use of an electrode composed of titanium plated with platinum at a high current density of over 100 amp./dm.$^2$, and a voltage of not more than 4.5 volts, and still with a high current efficiency.

Another object of the invention is to provide an electrolytic cell adapted for embodying the process of the invention.

Still another object of the invention is to provide an anode adapted for embodying the process of the invention.

Other objects and effects of the invention will become apparent from the following description.

When electrolysis is carried out with a graphite anode of an ordinary type, gas bubbles formed on the electrode surface gradually grow to a diameter of about 0.5 to 1 mm., and begin to move on the flow of the liquid with their own buoyancy. While moving along the electrode surface, the bubbles further grow to a diameter of about 2 to 3 mm., sometimes even 6 to 8 mm. They finally rise up and are discharged out of the cell through channels or gas ports.

Usually in the mercury method, the anode is horizontally disposed, and therefore gas, if any, is accumulated on the flat portion of the electrode surface, as a result of which the electrolytic action on said portion is interrupted. In order to overcome this difficulty, numerous attempts have heretofore been made to improve the processes of making plates and effecting electrolysis. However, all such improvements envisage the use of current density within a range of less than 100 amp./dm.$^2$. Operation with a high current density of over 100 amp./dm.$^2$ has not been advisable because of various difficulties accompanied.

At a high current density of over 100 amp./dm.$^2$, the gas bubbles formed are minute in size but large in total volume, and the amount of bubbles generated is greater than that of the bubbles breaking on the surface of the electrolyte. As the result, a difficulty arises in bursting the gas bubbles on the electrolyte surface which has otherwise posed no problem when a low current density of less than 100 amp./dm.$^2$ is used as heretofore. Consequently, a layer of accumulated gas bubbles is formed in the boundary area of the electrolyte and the gaseous phase in the amalgamation chamber, with the result of a rise in the electrolytic voltage. For example, if electrolysis is carried out in a conventional electrolytic cell at a current density of over 180 amp./dm.$^2$, all the space other than the underside of the electrode is occupied by an accumulated layer of gas bubbles, and the amalgamation chamber is filled with a foam, causing a sharp increase in the electrolytic voltage.

The bubbles not only isolate the area to be electrolyzed from effective electrolysis, but cut off the supply of salt water to the electrode surface. This phenomenon of bubble accumulation does not occur in an ordinary electrolytic cell wherein a graphite anode is used at a current density of not greater than about 100 amp./dm.$^2$ as above described. Therefore, draining of the saline water has usually been carried out by draining it from the amalgamation chamber into the saline water separation chamber in the end box, for the purpose of preventing hydrogen gas produced secondarily by broken graphite chips floating on mercury surface from being mixed into chlorine gas. However, this step of draining thin saline water from the bottom of the amalgamation chamber, if used with a higher current density, will rather promote accumulation of bubbles and decrease the effective electrolysis area of the anode, thereby to cause deterioration of the electrolytic conditions, as above described. Hence, in order to carry out electrolysis with high efficiency at a high current density of over 100 amp./dm.$^2$, not only improvements in the ordinary means of defoaming of the electrode surface and in designing the electrode structure are necessary, but additionally it is imperative to devise a defoaming method whereby to remove the foam layer produced on the top surface of the electrolyte in the amalgamation chamber so that the effective area of electrolysis can be kept as large as possible.

An anode plate of the ordinary type is provided with channels or holes which enhance the defoaming effect and increase the effective electrolytic area, thereby contributing to drop the working voltage, at a low current density. When used at a high current density, however, it has many disadvantages. Since the total amount of bubbles formed on the anode surface is greater than the amount breaking on the electrolyte surface to be set free in the gaseous state, on the foam layer quickly grows to such proportions as to cover the underside of the anode as well. Also, a plate of ordinary structure has such great thickness that it helps the produced bubbles remain for a prolonged period, with the result that the foam prevents the effective area from being electrolyzed thereby causing a rise of the voltage. Furthermore, a large thickness in the plate necessitates an accordingly large mean interpole distance in practice, to a disadvantage in respect of effective use of electric power.

On the other hand, a platinum-titanium anode has many features as described earlier, for which it is suitable as an anode material for use at a high current density. In practical applications it is advisable that the anode have a structure which, in view of the fact that the bubbles formed at a high current density are minute and large in total volume, has narrow inter-channel distances and is as thin in plate thickness as the current capacity of the plate permits, so that the foam produced can be immediately guided to an area where it does not cover the effective electrolytic area which, as described above, interrupts the electrolysis. The plates of the anode should be thinned and the number of said plates should be increased to make the effective electrolysis area as large as possible in a certain cathode area, and further the thickness (height) of said plates should be as small as possible to make the true mean interpole distance a minimum.

One way of dropping the electrolytic voltage is to shorten the interpole distance and to lower the resistance voltage of the electrolyte. In electrolysis of alkali salt, diffusion of chlorine gas generated at the anode and its charging cause a secondary reaction, which in turn brings a decline in current efficiency. For this reason it has been generally accepted in the art that an economical interpole distance is from 3.5 to 3.8 mm.

The present inventors, as a result of experiments conducted with platinum-titanium anodes, found that electrolysis can be effected even if the interpole distance is less than 3.5 mm. or sometimes even below the mercury level, by increasing the current density. No short-circuit took place, but rather the voltage dropped, and the current efficiency was high. The discovery finally led to establishment of a method of carrying out electrolysis quite advantageously at a super-high current density of 300 amp./dm.$^2$ and a voltage of not greater than 4.5 volts with an epochal current efficiency of 99%.

The process of the invention comprises carrying out electrolysis at a high current density by the use of a platinum-titanium anode instead of the ordinary graphite electrode, by removing bubbles together with lightly saline water promptly after electrolysis from the amalgamation chamber, with an interpole distance of less than 3.5 mm., or sometimes even inserting the anode end into the mercury below its level.

Removal of the bubbles is effected by forcible overflow discharge by means of suction, overflowing, or defoaming impellers which are described later, or by giving a jet of saline water or chlorine gas. Addition of a defoaming agent or application of heat is also useful for this purpose.

The anode assembly for use in the invention consists of a thin titanium plate cut into narrow ribbons and combined together to form a plate arranged vertically or inclined with respect to the cathode, integrally formed with a conductive portion made of a good conductor.

The present invention is described in further details with reference to the appended drawings, in which:

FIGS. 5, 6, 7 and 8 illustrate apparatus suitable for carrying out the present invention.

The plate arrangement of the anode material for use in the invention is available in many different combinations, e.g. parallel, concentric, spiral, lattice, radial and other combined arrangements. A lattice-type combination embodying the invention, shown in FIG. 1, consists of conductive portions 1, 2, 3, 4 and 5, and plates 6 and 7.

Figure 1:
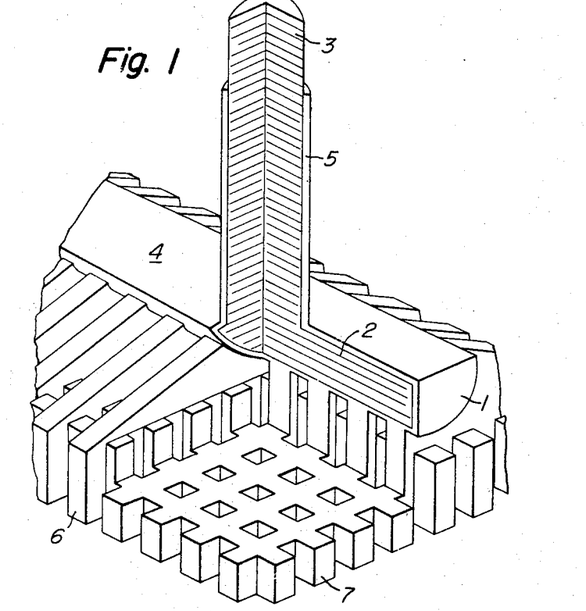
FIG. 1 is a perspective view, partly sectioned, of an anode assembly for use in the invention.

The conductive portions 1, 4 and 5 are made of thin tititanium plates. To the bottom of portion 1, a plate 6 is welded. Inside portion 1, the titanium plates are closely attached to a steel or aluminum member having good conductivity, and a longitudinal conductor 3 is further attached closely thereto. The titanium sheet 5 of the longitudinal conductor 3 is welded at the bottom to the titanium plates 4, so that the conductors 2 and 3 are not directly exposed to the electrolyte, and the conductors 1 is closely attached electrically to the conductor 2.

The plates 6 and 7 welded to the conductive portions, are united together either by combination in shapes or by welding together at their upper sides. With a high current density, the anode assembly may be provided with a single or several conductive portions above described. It is also possible to form the portions 1, 6 and 7 integrally by casting or to form only the combination of 1 and 6.

Figure 2:
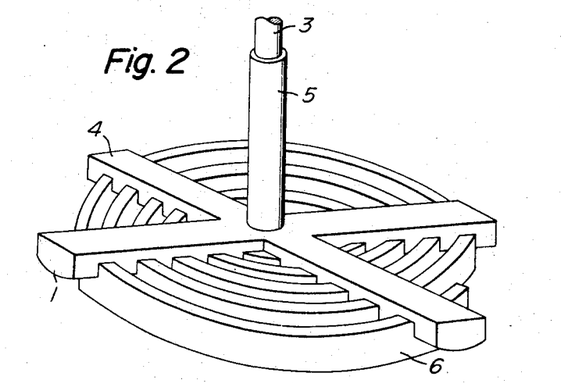
FIGS. 2 and 3 show the outward appearances of other embodiments of the anode assembly for use in the invention.
Figure 3:
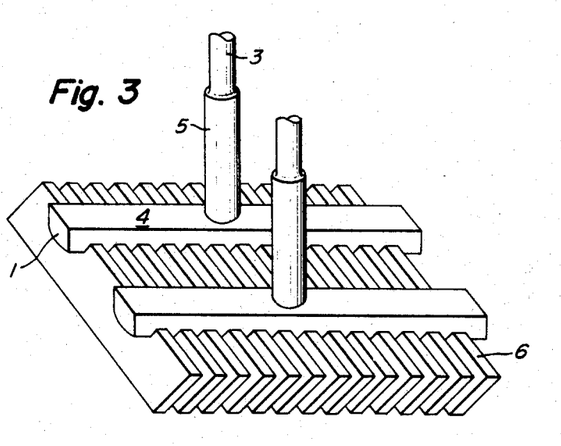

FIG. 2 illustrates an anode assembly of spiral type according to the invention, and FIG. 3 an anode assembly of parallel type according to the invention. In these figures and FIG. 1, like symbols designate like parts.

Figure 4:
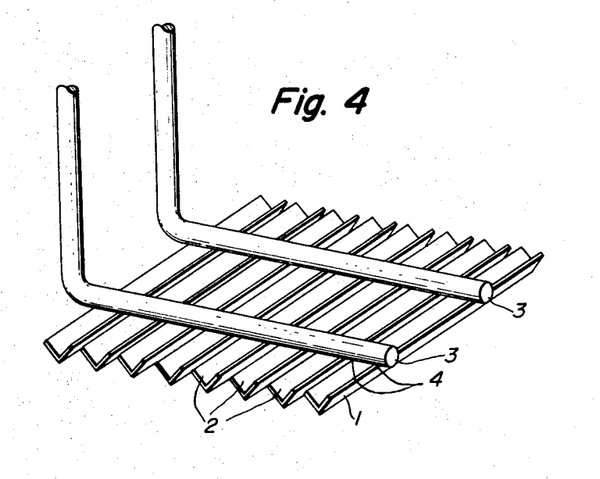
FIG. 4 is an outward appearance showing still other embodiment of anode assembly, FIGS. 4a, b, c, d are partly broken cross-sectional views parallel to the electroconductive portion 3 showing various modifications of the plate.
Figure 4A:
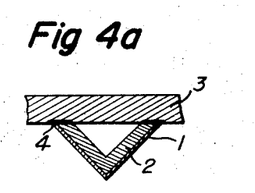
Figure 4B:
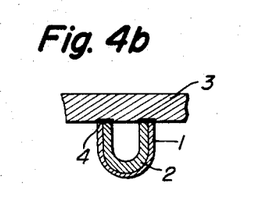
Figure 4C:
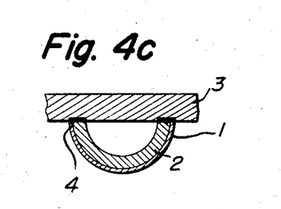
Figure 4D:
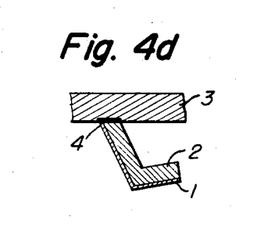

FIG. 4 illustrates still further modifications of the anodes according to the invention. The anodes consist of conductive portions 3 and titanium plates 2 plated with platinum 1. The titanium plates are treated as shown in FIGS. 4a, b, c and d, and arranged with an appropriate interval between each other and are united with the electroconductive portion 3 at the undersurface 4 thereof.

According to the present invention, the anode consists of thin plates arranged in a combination either vertically or with a certain inclination with respect to the cathode surface. Therefore, the overall volume of gas bubbles which remain on the plate surface is limited, and satisfactory defoaming is achieved. By close combination of thin ribbon-like sheets which constitute the plates, sufficient current capacity is obtained despite a decrease in the thickness (height) of the plates, whereby the gas bubbles produced are immediately urged to the rear sides of the plates so as not to isolate the effective electrolytic area of the plates. The vertical or inclined arrangement of the plates with respect to the flow of saline water brings advantages in that the effective electrolytic area can be increased and the flow of saline water is urged only in a single direction from the bottom upward, and thus the current efficiency is not affected by the shortened interpole distance.

Figure 5:
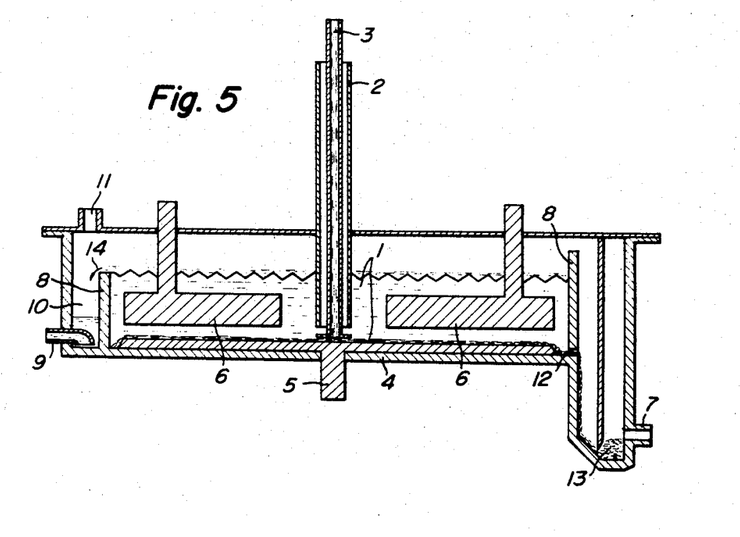
FIG. 5 is a cross-sectional view of an electrolytic cell provided with overflow means for the removal of gas bubbles.
Figure 5A:
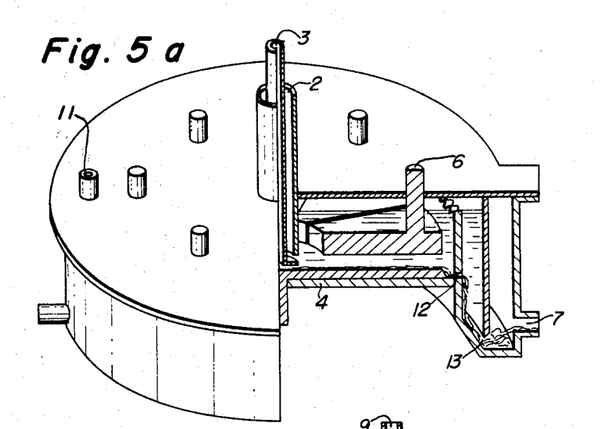
FIG. 5a is a perspective partly cross-sectional view of the electrolytic cell of FIG. 5
Figure 5B:
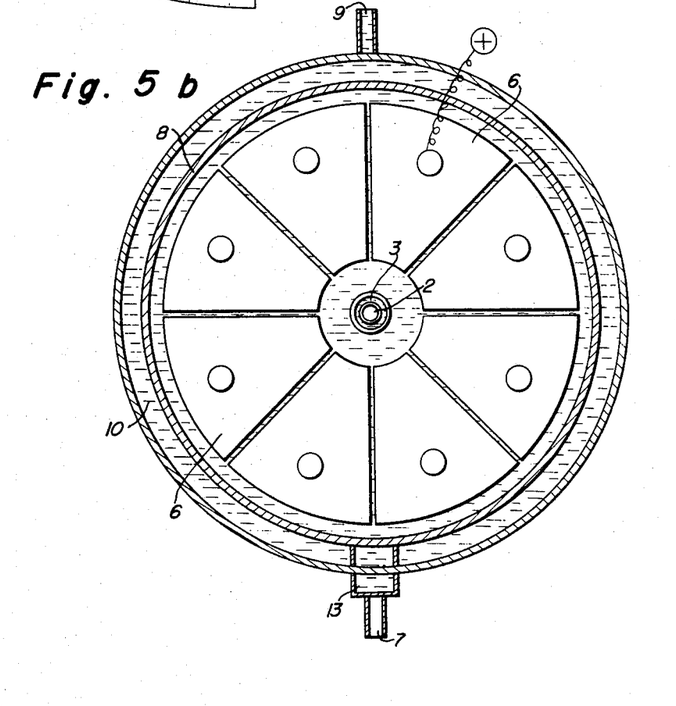
FIG. 5b is a plane view of FIG. 5.

Next, the process and apparatus according to the invention are described with reference to the drawings. In FIG. 5, there is shown an electrolytic cell equipped with overflow means for removal of bubbles. First, saturated saline water is supplied to the central portion of the bottom of amalgamation chamber 1 through a saturated saline water feed pipe 2, and is further fed between the cathode 5 and anode 6, where it is electrolyzed, Saline water ascends together with chlorine gas generated, through clearances between the plates, and immediately floats on the surface of electrolyte on the rear sides of plates. The bubbles of chlorine gas formed then are moved together with saline water in the direction indicated by arrow 14 on account of the natural overflowing of saline water, and are overflown through V-shaped channels cut in overflow wall 8, and are then removed from the amalgamation chamber 1 into a saline water-gas separating chamber 10 provided on the periphery of the amalgamation chamber. The bubbles dropped into the saline water-gas separating chamber are burst there and are completely separated into gas and saline water. Thus, saline water is taken out of the separating chamber through a lightly saline water discharge pipe 9 while maintaining a certain level, while chlorine gas is also taken out through a discharge pipe 11 and is led into a chlorine-treating device.

Figure 6:
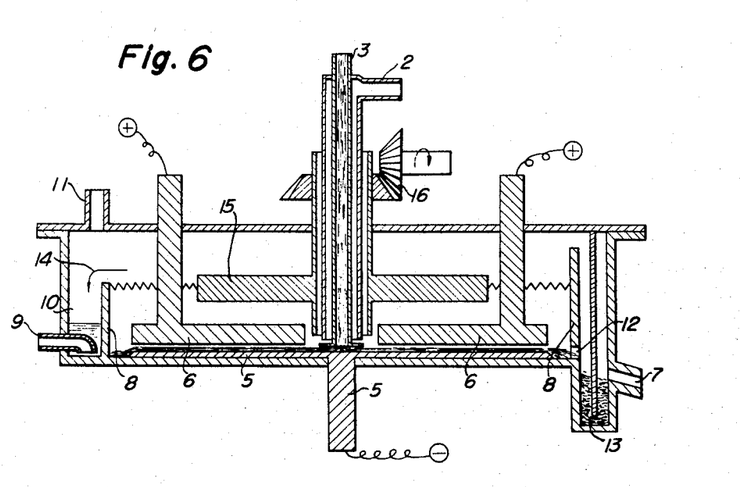
Figure 6A:
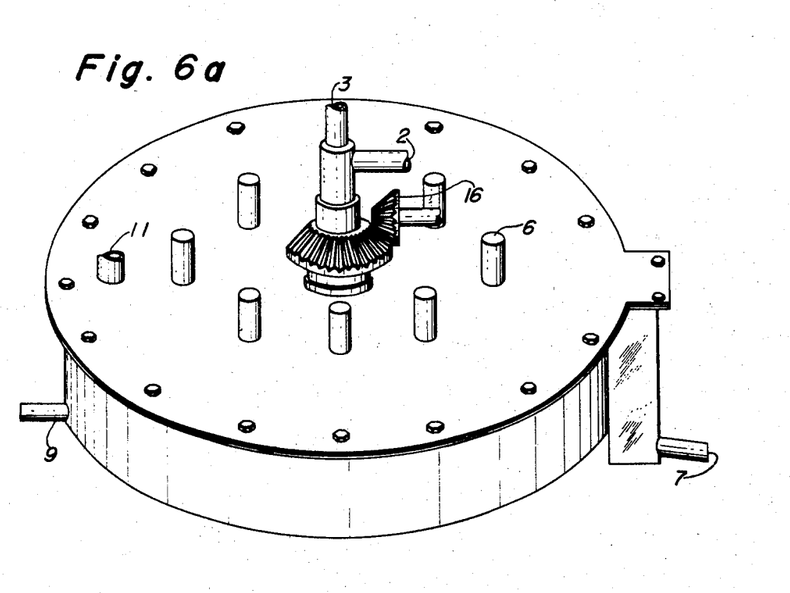
FIG. 6a is a perspective view of the electrolytic cell of FIG. 6
Figure 6B:
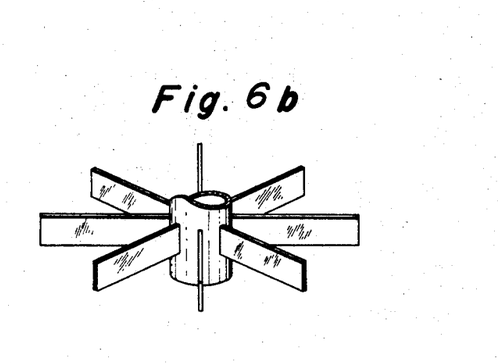
FIG. 6b is a perspective view of rotary impellers 15 of electrolytic cell shown in FIG. 6.
Figure 8:
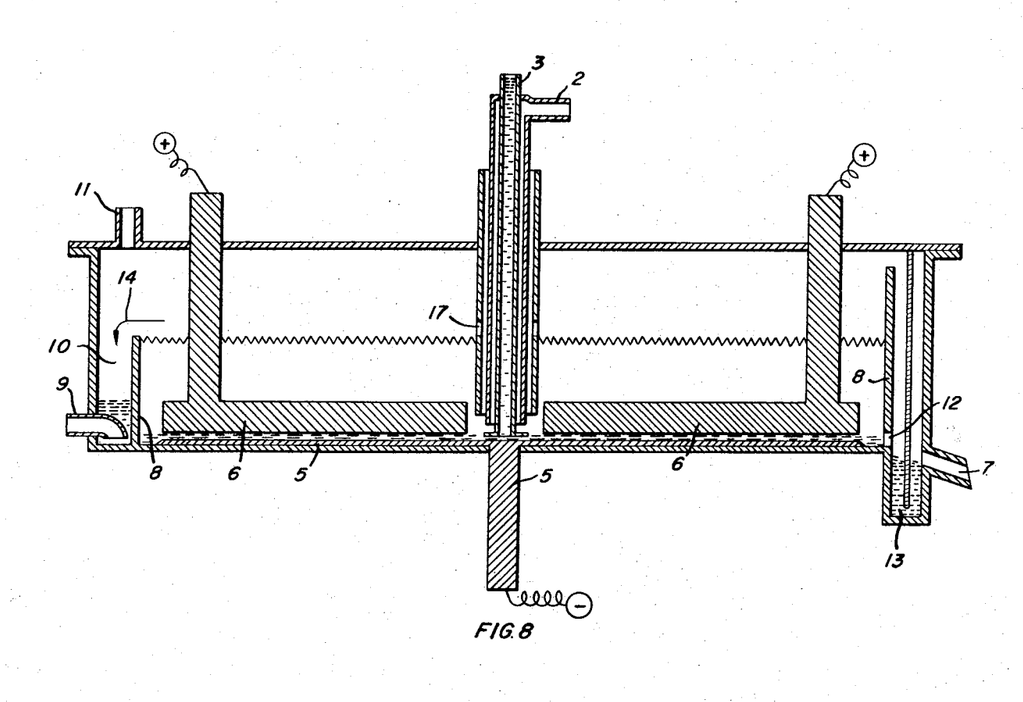

FIG. 6 shows an electrolytic cell to which forcible overflow discharging is applied by means of foam-releasing impellers for elimination of gas bubbles. In the same manner as in the overflow process above described, saline water is electrolyzed and is overflown together with gas bubbles through a separator wall 8 in the direction indicated by arrow 14. Further, in order to accelerate the overflowing, rotary impellers 15 are provided and a rotary motion is caused by means of a rotary device 16 from the outside of the cell, whereby saline water is led together with gas bubbles formed, out of the amalgamation chamber. FIG. 8 is a further modification of the cell shown in FIG. 6. In FIG. 8, there are provided in place of rotary impellers 15 and rotary device 16, a series of jet feed pipes on the outside of the mercury feed pipes 2 and 3 provided with a multiplicity of jet spouts horizontally on the height of the separator wall 8, so that the flow from the central portion toward the outside may be forcibly overflown by supplying a large amount of saline water or chlorine gas through the feed pipes.

In FIGS. 5 and 6, mercury is supplied to a portion above the cathode plate 5 through mercury feed pipe 3, dispersed toward the peripheral portion of the cell, and then overflown, during which it is converted to amalgam and is separated into an amalgam separating chamber 13 through amalgam discharging port 12, and finally is taken out of the cell through amalgam outlet port 7.

Figure 7:
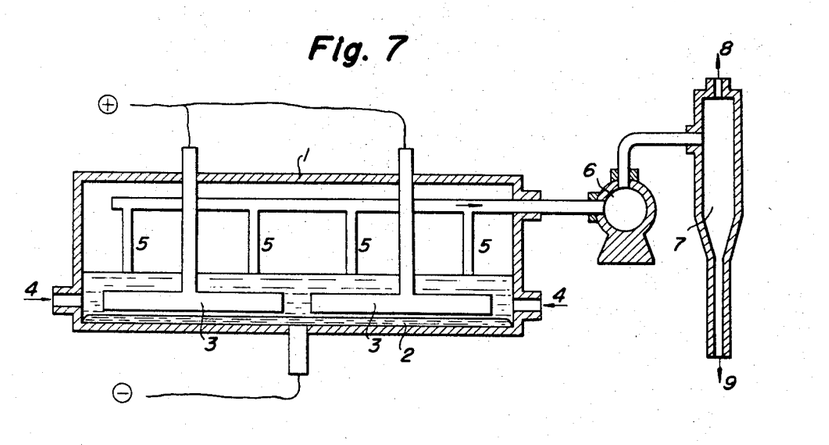

FIG. 7 shows another embodiment of an electrolytic cell according to the invention, provided with suction means for removal of gas bubbles. In this apparatus, a suction pipe provided with several openings is disposed above the anode plate in the amalgamation chamber, and the layer of gas bubbles formed on the upper surface of the plate is sucked, together with lightly saline water used for electrolysis, out of the cell by a pump or other suction means. In FIG. 7, the electrolytic cell has a flat, horizontal bottom, where mercury 2 flows, constituting a cathode. An anode 3 is disposed opposite the cathode, defining in between an amalgamation chamber 1. Saline water supplied through a port 4 for supply of concentrated saline water is electrolyzed in the space between the electrodes 2 and 3. The sodium produced combines with mercury to form amalgam and is taken out of the amalgamation chamber 1. On the other hand, the minute bubbles of chlorine gas generated on the anode surface ascent immediately through the anode clearance up to the rear side of the anode. The gas bubbles and thin saline water electrolysis are discharged out of the amalgamation chamber through suction ports 5 provided above the anode, by means of a suction pump 6. The mixture discharged is then separated by a gas-liquid separator 7 into chlorine gas and thin saline water, and chlorine gas is taken out through a gas outlet 8 and saline water through a liquid outlet 9.

This process makes it possible to use shorter displacement distance of bubbles than in the case of the overflow process, and hence is more effective as it permits faster removal of the gas foam. The manner of supplying mercury and saline water may be freely modified in any of the foregoing types.

According to the present invention, saturated saline water fed to the amalgamation chamber is electrolyzed between the plates, and ascend together with a large amount of minute bubbles produced, through clearances between plates, immediately up to the rear sides of the plates, and then is carried out of the amalgamation chamber. Thus, the growth of the foamed layer is inhibited, and interruption of the space between anode plates with foam does not occur. Hence, any drop in current efficiency can be prevented even when the interpole distance is shortened to an extreme extent. This is apparently because the saline water fed into the amalgamation chamber forms, for the most part, a unidirectional flow route from the bottom to the upside, and particularly because the saline water electrolyzed on the anode surface flows upward, and not contrary to the direction of the cathode, and is immediately carried out of the sublimation chamber.

By the process of the invention, electrolysis can be carried out normally even when the electrode plates are pushed downward below the mercury level, that is, even when the interpole distance is shortened substantially to a value of zero or on the minus side. The reason for this is that, in electrolysis at a superhigh current density, the bubbles formed are minute in size and very large in total volume, and therefore an anode end immersed in mercury is cushioned by a gas phase of minute bubbles between the depressed mercury surface and the electrode end, and saline water is adequately replenished as it is sucked in by the upward movement of the bubbles. No short-circuit takes place at this juncture, but rather the interpole distance can be shortened ideally. Thus, not only a voltage drop is attained, but the resistance voltage of the electrolyte can be decreased without any loss in the current efficiency, thereby bringing the voltage a step closer to the theoretical decomposition voltage. Moreover, the use of a platinum-titanium anode according to the invention which has wear resistance unlike ordinary electrodes simplifies the interpole adjusting means and enables the interpole distance to be shortened readily and conveniently to an extreme extent.

Since the anode assembly is subjected to a high current density, the minute gas bubbles formed come easily off the electrode surface, and the increase in flow rate of saline water per unit area accelerates the flow velocity of the liquid and the ascending velocity of the gas bubbles, with a consequent improvement in defoamability. This permits the plates to be arranged with decreased gaps and in a combination of an increased number of plates. Hence, despite a decrease in thickness, or height, of each plate, the effective electrolytic area can be increased. Moreover, the thin plates can shorten the true mean interpole distance, and urge the gas bubbles produced to move immediately toward the rear sides of plates, thereby to prevent the electrolytic area from being isolated by the foam.

As described hereinabove, defoaming of the amalgamation chamber by the use of an anode made of titanium plated with platinum, as in the invention, permits electrolysis to be effected at a high current density. Also according to the invention, saline water is caused to flow in a single direction, from the lower side to the upper side, and particularly the thin saline water to be drained upon completion of electrolysis is caused to flow in a direction contrary to the cathode, and further the interpole distance is made as short as possible. Such arrangements have made it possible to raise the current efficiency at an interpole distance of less than 3.5 mm. which has otherwise posed great difficulties under ordinary processes, and has finally led to the epochal electrolysis process of the invention whereby electrolysis is carried out as such a high current density of 300 amp./dm.$^2$ and an electrolyzing voltage of 4.5 volts, with current efficiency of 99%.

The effects attained by the procss for electrolysis as above described are remarkable, in improvement of the unit power to be used, curtailment of construction cost, and in many other respects.

Example 1

Test results obtained by the use of an electrolytic cell (FIG. 3) equipped with a suction means for defoaming according to the invention are compared with those obtained by an electrolytic cell of ordinary type are given in Table I below. (In both vessels, electrodes such as shown in FIG. 1 were used.)

TABLE I

|  | Process of Invention | | | Ordinary process |
|---|---|---|---|---|
| Current density (amp./dm.$^2$) | 100 | 200 | 300 | 180 |
| Elec. cell voltage (volt) | 3.4 | 4.0 | 4.6 | 5.2 |
| Elec. cell temp. (° C.) | 80 | 80 | 80 | 80 |
| Current efficiency (percent) | 97.0 | 97.0 | 98.4 | 97 |
| Amalgam conc. (percent) | 0.15 | 0.16 | 0.16 | 0.16 |
| Saline water inlet conc. (g./l.) | 310 | 310 | 310 | 310 |
| Saline water outlet conc. (g./l.) | 250 | 250 | 250 | 250 |
| Interpole distance (mm.) | 0.5 | 0.5 | 0.5 | 0.5 |

Example 2

Results of electrolysis conducted with the anode body according to the invention (A) and those of electrolysis with a graphite anode as specified by the Patent No. 279,365 (B) are compared in the following Table II.

TABLE II

|  | A | | | | B |
|---|---|---|---|---|---|
| Current density (amp./dm.$^2$) | 50 | 100 | 200 | 300 | 50 |
| Elec. cell voltage (volt) | 3.2 | 3.3 | 3.9 | 4.5 | 4.48 |
| Elec. cell temp. (° C.) | 80 | 80 | 80 | 80 | 75 |
| Current efficiency (percent) | 95 | 97.3 | 98.0 | 99.2 | 94 |
| Amalgam conc. (percent) | 0.16 | 0.16 | 0.16 | 0.16 | 0.12 |
| Saline water inlet conc. (g./l) | 310 | 310 | 310 | 310 | 310 |
| Saline water outlet conc. (g./l) | 250 | 250 | 250 | 250 | 250 |
| Interpole distance (mm.) | +0.5 | ±0 | −0.5 | ±0.5 | 4 |

What we claim is:

1. A cell for electrolyzing an alkali salt which comprises a base, a continuous separator wall secured to said base and defining therewith an amalgamation chamber adapted to receive an alkali salt solution to be electrolyzed and mercury to be amalgamated thereby with the formation of chlorine, an exterior wall secured to the base and defining with the base and separator wall a saline water-gas separator chamber adjoining said amalgamation chamber, said separator wall having an upper edge over which the electrolyzed alkali salt solution and chlorine gas can overflow from the amalgamation chamber into the saline water-gas separation chamber, means associated with the saline water-gas separation chamber for discharging chlorine gas and electrolyzed alkali salt solution from the cell, an amalgam separating chamber adjoining a portion of the amalgamation chamber and communicating therewith through an amalgam discharge port provided in the separator wall where the separator wall is secured to the base, the separator wall being lengthened in the region of the amalgam discharge port to prevent overflow of electrolyzed alkali salt solution and chlorine gas in such region and means for discharging amalgam from said amalgam separating chamber.

2. A cell as claimed in claim 1 wherein the upper edge of the separator wall over which electrolyzed alkali salt solution and chlorine gas overflow is provided with a series of notches.

3. A cell as claimed in claim 1 comprising partition means in said amalgam separating chamber for dividing the amalgam separating chamber respectively into a zone receiving amalgam from the amalgamation chamber and a zone from which amalgam is discharged from the cell.

4. A cell as claimed in claim 1 comprising means for promoting the overflow of electrolyzed alkali salt solution and chlorine gas from the amalgamation chamber into the saline water-gas separating chamber.

5. A cell as claimed in claim 4 wherein the means for promoting the overflow of electrolyzed alkali salt solution and chlorine gas is a rotary impeller.

6. A cell as claimed in claim 4 wherein the means for promoting the overflow of electrolyzed alkali salt solution and chlorine gas is a jet spray means.

References Cited

UNITED STATES PATENTS

| 3,265,490 | 8/1966 | Yoshizawa et al. | 204—99 XR |
| 3,268,427 | 8/1966 | Schücker | 204—99 XR |
| 645,055 | 3/1900 | Anderson | 204—220 |
| 705,264 | 7/1902 | Mactear | 204—220 |
| 2,916,425 | 12/1959 | Fujioka et al. | 204—221 XR |
| 3,308,043 | 3/1967 | Loftfield et al. | 204—219 XR |
| 3,310,482 | 3/1967 | Bon et al. | 204—219 |

FOREIGN PATENTS 804,921  11/1958  Great Britain.

HOWARD S. WILLIAMS, *Primary Examiner.*

D. R. VALENTINE, *Assistant Examiner.*